United States Patent [19]

Schröder

[11] 4,195,346

[45] Mar. 25, 1980

[54] METHOD AND APPARATUS FOR SORTING AND CLASSIFYING TIMBER

[76] Inventor: Staffan H. Schröder, Kyrkängsvägen 9, S-802, 40 Gävle, Sweden

[21] Appl. No.: 849,687

[22] Filed: Nov. 8, 1977

Related U.S. Application Data

[63] Continuation-in-part of Ser. No. 670,389, Mar. 25, 1976, abandoned.

[51] Int. Cl.² ............................................. G06F 15/46
[52] U.S. Cl. ................................. 364/475; 144/312; 209/942; 364/120; 364/478; 364/464
[58] Field of Search ............... 364/120, 475, 474, 478, 364/469, 400, 464, 105; 144/2 R, 3 R, 3 A, 3 D, 3 E, 312; 83/71, 72, 73; 209/521, 942; 214/11 R

[56] References Cited

U.S. PATENT DOCUMENTS

| | | |
|---|---|---|
| 3,554,249 | 1/1971 | Arnelo et al. ..................... 144/312 |
| 3,702,626 | 11/1972 | Mills ..................................... 83/73 |
| 3,910,142 | 10/1975 | Jureit et al. ......................... 83/71 |
| 3,931,501 | 1/1976 | Barr et al. ......................... 83/71 X |
| 3,941,019 | 3/1976 | Baldwin et al. ................. 144/312 X |
| 4,023,605 | 5/1977 | Hellstrom et al. .............. 144/312 |

Primary Examiner—Joseph F. Ruggiero
Attorney, Agent, or Firm—Seed, Berry, Vernon & Baynham

[57] ABSTRACT

Method and apparatus for sorting and classifying lumber in which multiple signals relating to length and quality of the lumber are fed to a computer which is programmed to select optimal cut-off length and optimal quality and to feed these selections to cutting or sorting apparatus for appropriate operations to be performed on the lumber.

11 Claims, 5 Drawing Figures

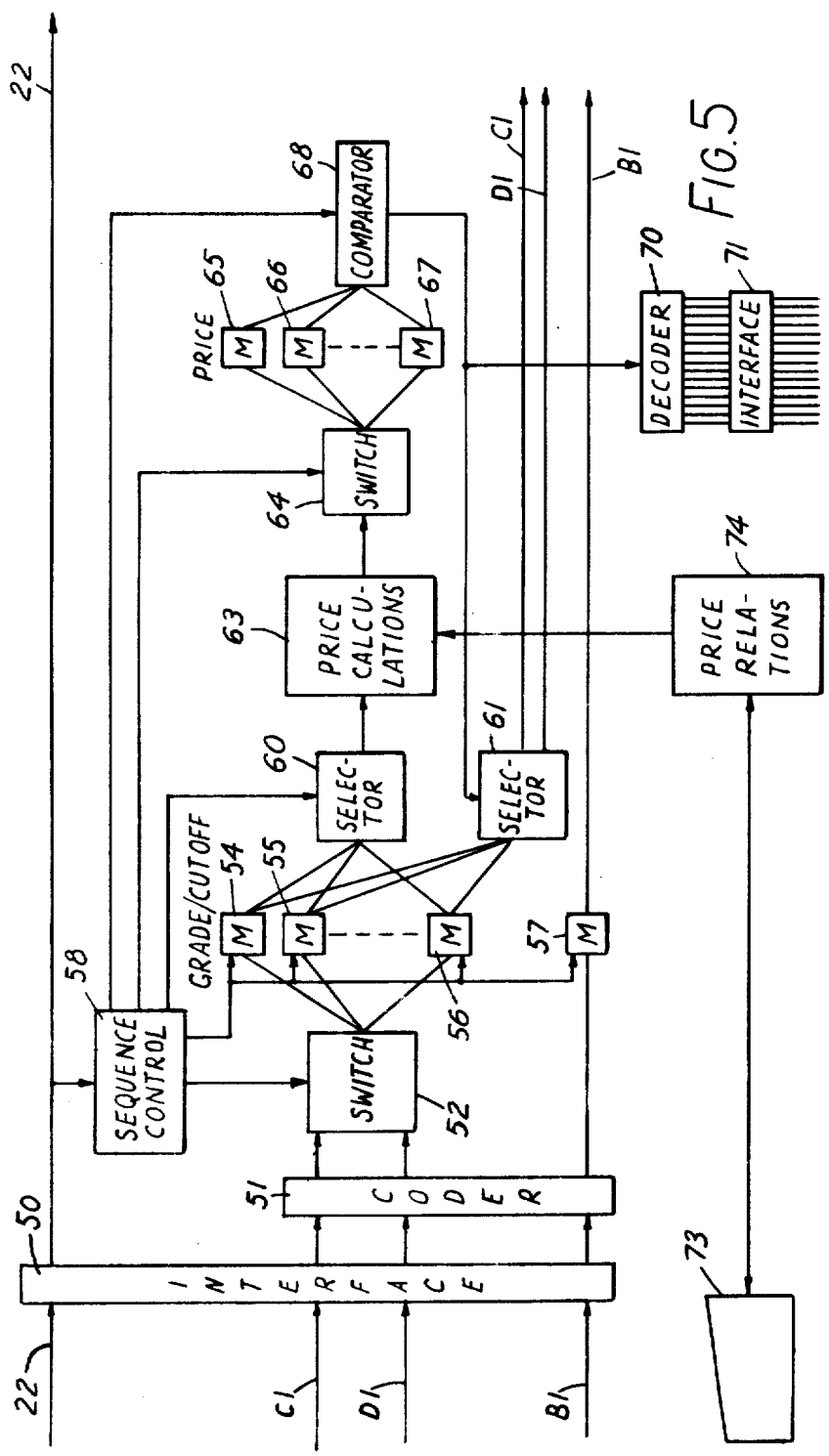

METHOD AND APPARATUS FOR SORTING AND CLASSIFYING TIMBER

This application is a continuation-in-part of prior application Ser. No. 670,389, filed Mar. 25, 1976, and now abandoned.

BACKGROUND OF THE INVENTION

1. Field of the Invention

This invention refers to a method and an apparatus for classifying lumber pieces such as boards and planks in the sorting station of a saw mill.

2. Description of the Prior Art

The length sorting and the quality classification are executed in a sawmill in a sorting station, where for example three inspectors are working. Pieces of lumber pass in front of them through an inspection zone with their narrow ends towards the inspectors and under automatic rotation along their longitudinal axes so that both faces of the board can be inspected. Every inspector has to decide with each third piece at which length it shall be cut-off in a cutting station to achieve optimal economical result. The greater part of the tapering board which is cut off the higher is the quality of the remaining part but at the same time the greater is the waste and the lower the wood yield. The inspector must therefore in approximately one second, during which time the piece of lumber on a conveyor means passes before his eyes, decide on two in principle contradictory selections, and by pushing a button in a first selection apparatus, a push button set, give an order to the cutting station, and by pushing another button in a similar second selection apparatus give an order to the assortment station into which quality group the cut-off piece of lumber will be sorted. Generally, the cut-off part can be selected in a length equal to 0 to 5 feet. Assume for example a 3 feet length cut-off is ordered. The piece of lumber passes then, after the inspection zone, before a length measuring unit such as a series of photocells, where it is for example ascertained that the uncut piece is longer than 14, but shorter than 15 feet. The piece is then fed into a cutting station where it is cut to a length of 11 feet, i.e. 14 feet minus 3 times 1 foot minus the length-surplus over and above 14 feet because the final length is always adjusted to the nearest lower feet multiple.

Quality assortment is generally executed in four quality groups, viz: unsorted (US), fourth quality (IV), fifth quality (V) and sixth quality (VI). The highest quality is called unsorted and includes all lumber of the quality groups I, II, III and a limited part of the group IV, e.g. maximally 30% of the total of the US quality.

Into the fifth quality group belongs all lumber of the group V and the possibly remaining lumber of the quality IV.

The price relations between the quality groups vary with the state of the market. Neighbouring quality groups can for example differ with 20–30% in the case of pine and 10–15% in the case of spruce. In the high quality groups, price increases are proffered for low thickness, great widths and a special saw manner, so that the price relations sometimes can differ up to 50%.

Lumber pieces which become shorter than 9 feet are called "Stuage" and are paid only with ⅔ rds, if their share is great (e.g. according to an agreement more than 2 or 3% of the total wood volume). The cut-off waste is used for example for chippings for wood pulp production and the evaluation of such wood in relation to the lumber pieces has also great influence on the total economy of the sawmill production.

The inspector must thus in a time interval of one second—to make this interval longer would slow down the whole work rhythm of the mill—form an opinion on the optimal cut-off length, and by pressing a button in his say right hand selection apparatus (a set-up of push buttons) give via a control unit a corresponding order to the cutting station, and at the same time he must by pressing a button in his left hand selection apparatus (a similar set-up of push buttons) via the control unit give an order to the assortment station to group the cut-off piece in the compartment for a certain quality group. Both selections depend one on the other in accordance with the presently valid price relations between the quality groups.

SUMMARY OF THE INVENTION

The object of the present invention is to provide an improvement of this method and apparatus.

BRIEF DESCRIPTION OF THE DRAWINGS

FIG. 5 shows schematically the general arrangement of a computer used in accordance with the invention.

DESCRIPTION OF THE PREFERRED EMBODIMENT

Figure 1:
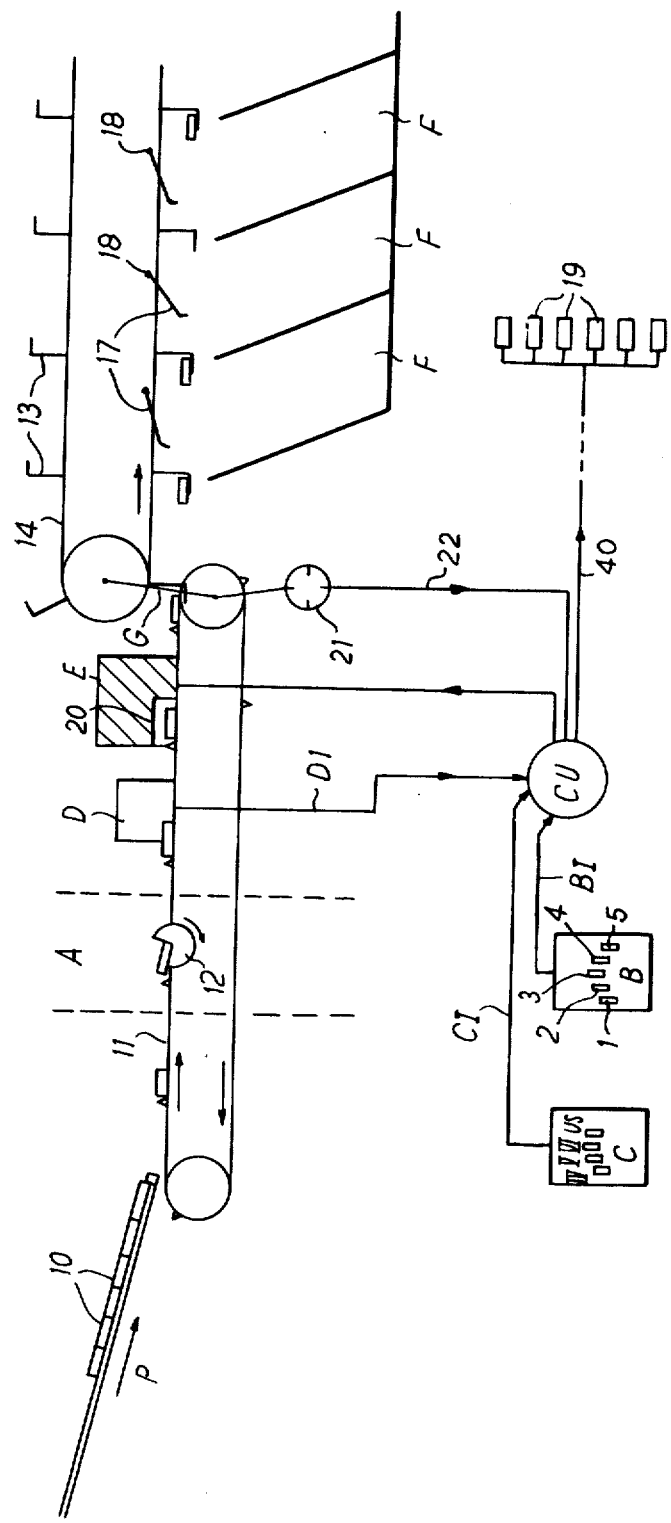
FIG. 1 schematically shows the conventional method.

According to FIG. 1, in the conventional manner, boards 10 are fed to a conveyer 11 in the direction of the arrow P and on the conveyor 11 through an inspection zone A before an inspector. The boards are turned over by a turning device 12 so that the inspector looks at both sides of the board. The inspector, with his right hand, presses one of the buttons 1 to 5 in a first selection device B for a cut-off length equal to 1 to 5 cut-off steps, and with his left hand presses one of the buttons such as VI, V, IV, US on a second selection apparatus C for assortment into bins F located after the gauging and cutting station E. Before the board 10 enters the gauging and cutting station E, it is measured in an automatic length measuring device D consisting for example of a plurality of photocells.

The boards are transferred to carriers 13 on an assorting conveyor 14 moving in predetermined relationship to the movement of the conveyor 11, as marked at G and are knocked off the carriers by means of kickers 17 which are levers pivoted at 18 and operated at appropriate moments so that they are brought into the path of the boards to push them off into the selected bins F.

The kickers are actuated by electro-mechanical devices such as solenoids 19 when energized by electrical pulses from an electronic control unit CU.

The control unit CU receives information from the selection devices B, C and from the length measuring device D.

The devices B, C in well known manner are in the form of switch devices which send electrical impulses, commonly in binary code, to the unit CU. Thus the connecting electrical cables CI and BI connecting the devices B and C to the unit CU will each include one conductor line for applying an electrical voltage from CU to B, C and several conductor lines for conveying electrical impulses from B, C to CU according to which buttons are pressed by the operator. Similarly data from length measuring device D are via the connection DI conveyed to the control unit CU. Thus information of quality, cut-off length and overall length are sent to CU in the form of electrical pulses in the well known manner. The unit CU then sends electrical instruction pulses to the gauging and cutting station. These pulses are transmitted to electro-mechanical devices such as solenoids to adjust stops 20 against which the boards are moved transversely to the movement of the conveyer 11 by continuously rotating rollers (not shown) so that a circular saw will cut off the selected length. The cut-off parts fall off into a waste bin while the quality lengths are fed on to the conveyer 14.

The conveyer 11 drives an incremental encoder 21 which also feeds electrical pulses to the control unit CU according to the speed of conveyance of the boards.

Figure 2:
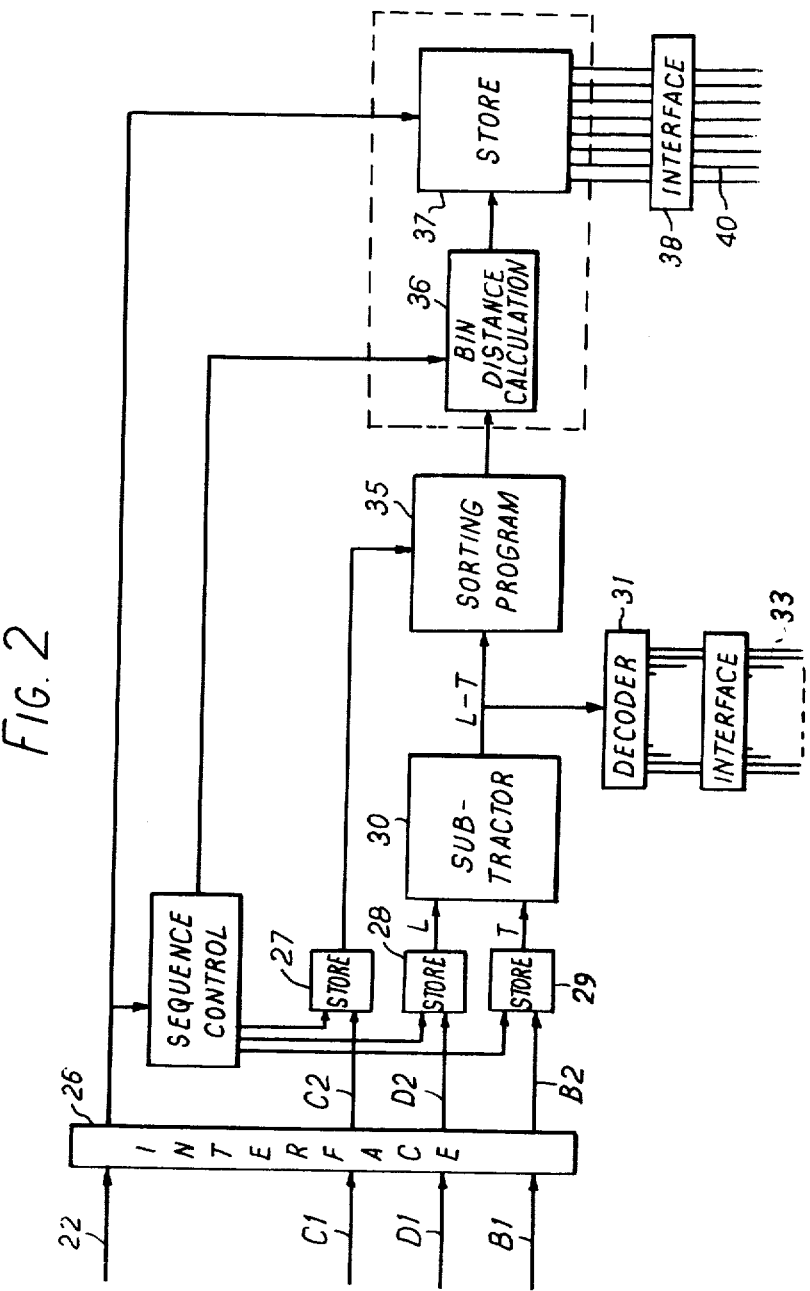
FIG. 2 schematically shows a conventional control unit.

FIG. 2 shows a flow diagram of the control unit CU. This comprises an interface unit 26 which serves to adjust the voltages to suit the memory stores 27, 28, 29. The interface thus receives the electrical pulses from (a) the encoder 21 on conductor line 22, (b) the length measuring device D on conductor cable DI, quality selection from C on conductor cable CI, and cut-off length pulses on conductor cable BI. The conductor cable CI may contain five conductor lines for the respective qualities. The cable DI may contain say 15 conductor lines for 15 lengths. The cable BI may contain 5 lines for the cut-off lengths. The number of conductor lines can of course be reduced if binary code pulses are used.

The interface 26 is connected by conductors C2, D2, B2 to the memory stores 27, 28, 29 which may be normal ferrite core type of memory stores.

The memory stores 28, 29 feed an electronic subtraction device 30 which develops electrical pulses representing the difference (L-T) between total length and cut-off length and this is fed to a decoder 31 (assuming use of binary coding) which is connected to an interface 32 for voltage adjustment and the interface 32 feeds on output lines 33 the electrical pulses to the gauging stops 20.

The L-T pulses together with pulses from the memory store 27 are fed to an electronic control circuit which may be implemented by a digital computer programmed with a sorting program 35 which in turn feeds pulses to an electronic timer which performs a bin distance calculation 36. The timer feeds pulses to an electronic transport memory store 37 from which pulses are fed via a voltage adjusting interface 38 and output conductors 40 to the electromechanical devices 19 actuating the kickers 17.

So far the description relates to known technical construction. The electronic devices are all well known to every electronic engineer.

Figure 3:
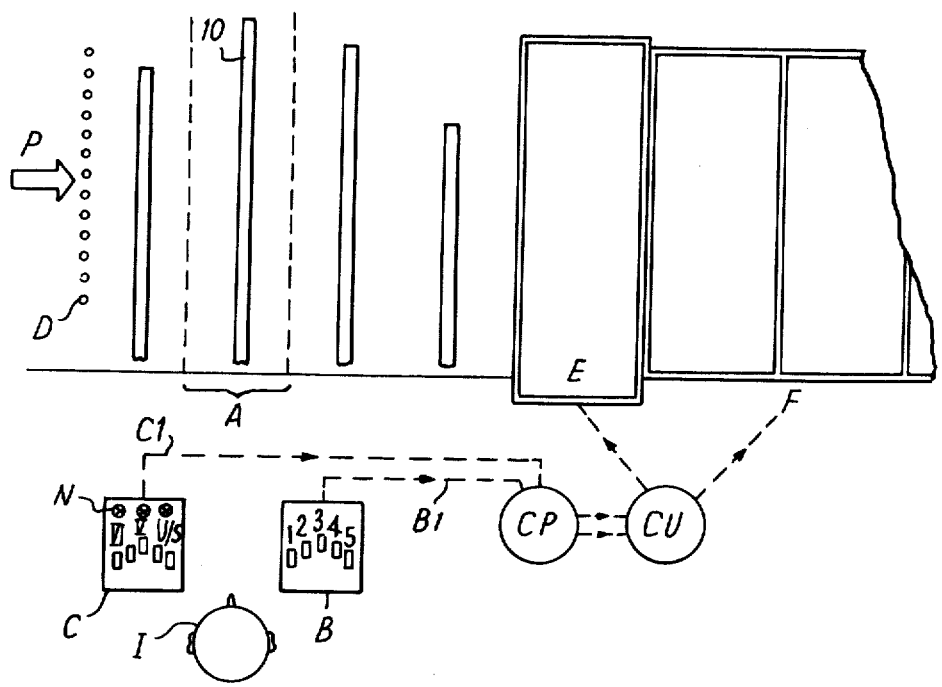
FIGS. 3 and 4 schematically show the method according to the invention.
Figure 4:
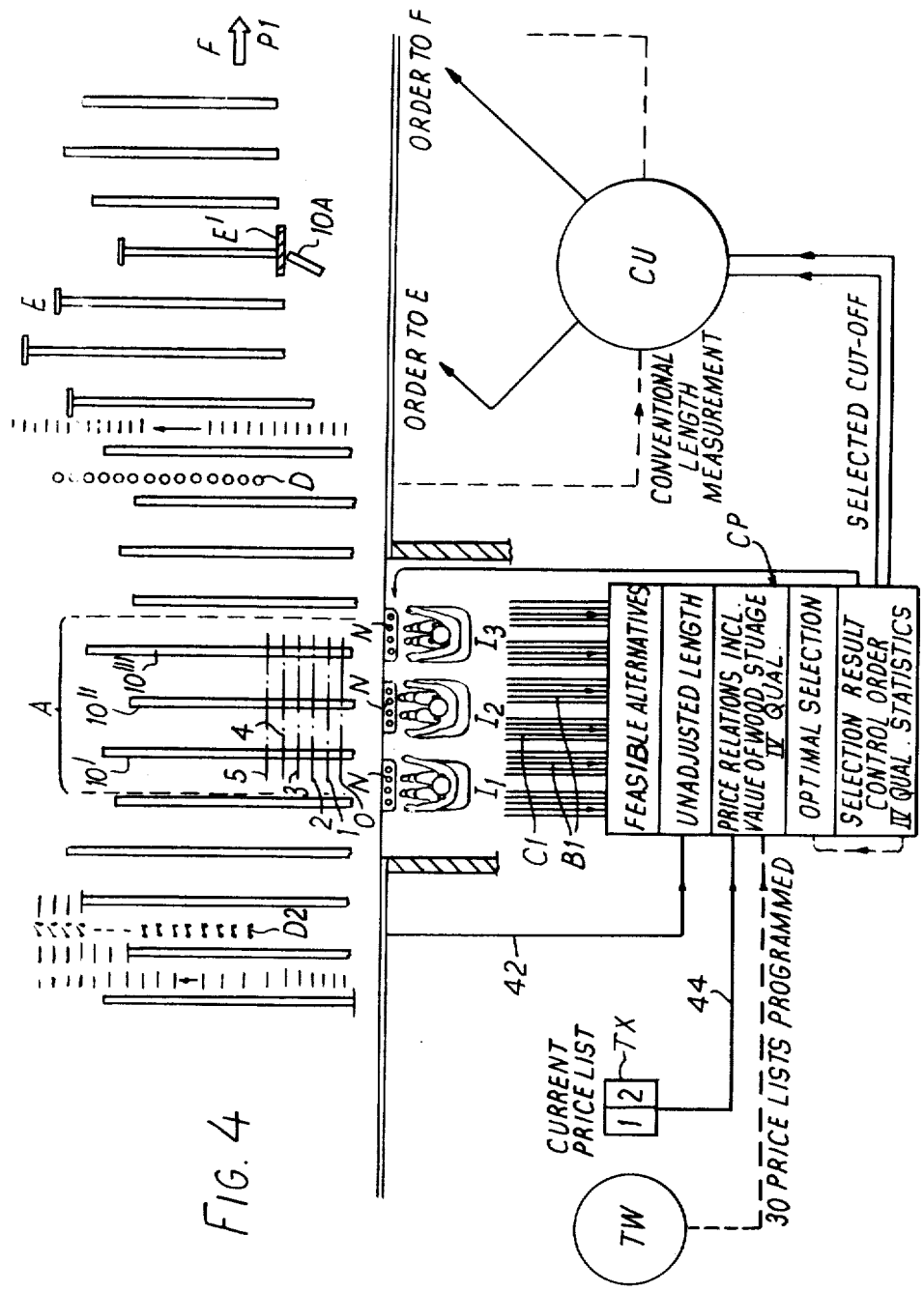

The present invention is illustrated in FIGS. 3, 4 and 5.

The arrangement shown in FIG. 3, which refers to the present invention, is in general similar to that shown in FIG. 1. However, the length measuring unit D has been moved to a location before the inspecting zone A. The one set of push buttons includes five cut-off buttons for 5, 4, 3, 2 or 1 foot cut-off lengths. For zero foot cut-off no order has to be given. The other set of pushbuttons includes five buttons for unsorted quality (US), III quality, IV quality, V quality and VI quality.

The chief difference compared with FIGS. 1 and 2 lies in the connection of the selection devices C and B to a computer means CP in such a way that from each of the devices B and C at least two electrical signals simultaneously and in parallel can be fed into the said computer means CP for processing therein.

Signal lamps N are also disposed on the selection apparatus C. These lamps are fed with current from the computer CP via conductor lines in the cable CI.

According to FIG. 4, three inspectors $I_1$, $I_2$, $I_3$ are working together in an assortment station, and each of them is classifying and sorting "his" board 10 respectively. A mechanical length measurement unit D2 is disposed before, and a photoelectronical length measuring unit D behind, the inspection zone A. The respective selection devices B, C at the working place of every inspector are not shown in this drawing, only the sets of signal lamps N. In the cutting station E a cutting blade E' cuts off a waste piece 10A, and the boards are then conveyed by a conveyor means as in FIG. 1 in the direction of the arrow P1 towards the assortment station F. TW is a console typewriter. TX is a switch device for sending price adjustment signals to the computer i.e. for increasing or decreasing all the prices given by the console TW.

It will be appreciated that the output side of the diagram according to FIG. 4 is, after the computer CP, identical with the diagram according to FIGS. 1 and 2. The fundamental difference lies in the signals (to E and to F) being processed in the computer means CP in accordance with a programme from TW. The input side of the diagram is therefore basically different from the conventional and the novel method, and so is of course the use of the programming unit CP itself.

The console typewriter TW is of well known form described in many text books e.g.

Introduction to Computer Engineering by B. S. Walker, University of London Press: pages 277 to 295. Or Computer Technology for Technicians and Technician Engineers by R. V. Watkin Published in the United States of America by Longman Inc. New York,: pages 180 to 197.

The same books also describe memory stores, address instruction devices, sequence control registers, subtractor circuits and other computer elements. Of course there are many other similar books of computer technology.

The necessary instructions i.e. programming for the computer is inserted into TW which issues a punched paper tape or punched card which is then fed into a tape reader which in turn feeds programme signals into the computer CP to programme it in the known manner for performing all the required functions.

The computer is conventionally illustrated in FIG. 5 and comprises an interface 50 which adjusts the voltages of the signals received from the conductor lines 22, BI, CI, DI. Signals from BIA, CIA, DIA are fed to a coder 51 (if not already coded), then through a switch 52 to memory stores 54, 55, 56, 57 together with sequence control signals from 22 via a sequence control circuit 58. The conductor lines 22A, BIA, CIA, DIA are the same as lines 22, BI, CI, DI of FIG. 2. Signals from the stores are fed through a selector circuit 60, 61. Signals from circuit 60 are passed to a price calculation circuit 63 switch 64, memory stores 65, 66, 67 and comparator circuit 68 to selector 61 and to a decoder 70 and interface 71 which controls the indicator lamps N (FIG.

4). Although all of the components shown in FIG. 5 can be hard wired circuits, they can also be implemented by a properly programmed, commercially available digital computer such as those identified hereinafter.

Signals from 22A via 50 go to line 22 and signals from selector 61 and from memory 57 go to the interface 26 of the control unit of FIG. 2. The price calculations circuit 63 is fed with price signals from a punched tape reader 73 via a price relations circuit 74.

Although five quality push buttons are shown, only three may normally be required viz. one for qualities I, II and III, one for quality IV and one for quality V. However the other buttons can be provided for useful purposes e.g. to indicate free from knots and number of IV quality.

The length measuring unit D can be placed in conventional manner after the inspection zone A and before the cutting station E, where it is possible for a beam with photocells to be screened off from stray light without impairing the view of the inspectors. If, however, the length measuring unit, or an additional length unit such as D2, is placed before the inspection zone A, the great advantage of immediately showing to the inspector with the help of the signal lamps N which of all the alternatives chosen by him has proved to be the best, is achieved. This possibility has an inspiring effect on the inspectors, a pedagogical effect on newly trained personnel and when new price lists are introduced, helps to promote production by showing to the inspectors which non-interesting alternatives should be omitted, and shows in which way quality IV should be handled.

The present invention will now be further explained with the aid of several examples. It will be however appreciated that the apparatus of course also can be used in the conventional manner by operating only one button on each selection apparatus. But the gist of the invention lies in the possibility of an "interrogative" selection, demonstrated in the following examples.

The arrangement shown in FIG. 4 is adapted to operate as follows:

The length of a board reaching the inspection zone A is measured by the length measuring unit D2 which provides a signal along line 42 to the processing unit CP, this signal being indicative of the unadjusted length of the board. One of the inspectors $I_1$, $I_2$, $I_3$ on visual inspection of the board chooses a first possible combination of quality and cut-off length and feeds this choice into the selection devices B and C by pressing the appropriate buttons provided thereon. The selection devices feed this information to the processing unit CP via the lines C1 and B1 respectively. The inspector now makes a second choice of the combination of quality and cut-off length and again feeds this information to the processing unit CP by using the selection devices B and C.

At this time the processing unit has already been fed with details of the current price list from TX, this information having been fed in via line 44. The computer is programmed to enable it to carry out a series of processing steps as follows:

(a) The calculation—

$$X_1 = (L - S_1)Q_1 + S_1 W$$

is carried out, where L is the original length of the board, $S_1$ is the first selected cut-off length, $Q_1$ is the relative value of the first selected quality and W is the relative value of waste wood;

(b) The calculation—

$$X_2 = (L - S_2)Q_2 + S_2 W$$

is carried out where $S_2$ is the second selected cut-off length and $Q_2$ is the relative value of the second selected quality; and (c) $X_1$ is compared with $X_2$ and where $X_1$ is greater than $X_2$ the processing unit enables a signal to be sent via line 16 to the control unit to order the cutting station E to cut the first chosen cut-off length $S_1$ from the board and to order the sorting station F to sort the board according to the first chosen quality. Similarly where $X_2$ is greater than $X_1$ the length $S_2$ is ordered to be cut off and the board is sorted according to the second chosen quality.

At the same time the processing unit enables a signal to be sent to the set of signal lamps N of the inspector who has made the choice, to indicate to him which of his selected combinations has, in fact, been ordered.

The arrangement may also be adapted to enable the inspectors to make more than two choices of quality and cut-off length combination, the processing unit CP being programmed accordingly to make the appropriate number of calculations and comparisons, in order to determine the best selected combination.

Other possible features of the computer program will become clear from the examples below.

It is also possible to incorporate the functions of the control unit CU into the computer CP which then issues the order signals to E and F.

The computer can also be programmed to accept all four signals simultaneously from an inspector.

EXAMPLE I

The inspector chooses either the fifth quality after cut-off steps, or sixth quality after 1 cut-off step. The computer is programmed according to a price list which includes the price relations VI:V = 0.89 and waste wood:V = 0.18. The length measuring unit indicates the original length of the lumber piece as 13 feet.
Alternative "Fifth Quality"
$(13-3) \times 1.00 + 3 \times 0.18 = 10.54$ (V-Feet)
Alternative "Sixth Quality"
$(13-1) \times 0.89 + 1 \times 0.18 = 10.86$ (V-Feet).

By "(V-Feet)" (=quinta-feet) is understood a conversion of all results to footage in a single quality group elected for comparison purposes, the Vth quality in the instance (as e.g. would be the conversion of gasoline consumption in different octane numbers to an equivalent consumption in a single elected octane group).

In this way economical comparisons can be made with a minimum of mathematical operations and thus considerable computer costs are saved.

The results in fifth-quality-feet (V-feet) show that the second alternative is better. The out-signals from the computer CP will adjust the cut-works E for a 1 step cut-off and the assortment works E for transportation into the "sixth quality compartment."

EXAMPLE II

Quality US after 4 steps cut-off, of fifth quality after 2 steps cut-off, or sixth quality without cut-off, is considered. The programmed price relations are US: V = 1.3, VI:V = 0.8 and waste wood:V = 0.1. Further is a certain "stuage depreciation" programmed in, in the present case in the form of a reduction number of −1 foot. The selection for the lengths 10, 11, 12 and 13 feet—which would be very difficult for the inspector to evaluate in time—would be as follows:

| Unadjusted length in feet: | 10 | 11 | 12 | 13 |
|---|---|---|---|---|
| Alternative "Unsorted" (V-feet) | 6.9 | 8.2 | 9.5 | 10.8 |
| Alternative "Fifth Quality" (V-feet) | 7.2 | 9.2 | 10.2 | 11.2 |
| Alternative "Sixth Quality" (V-feet) | 8.0 | 8.8 | 9.6 | 10.4 |
| If the chosen quality is the adjusted length in feet will be | VI 10 | V 9 | V 10 | US 9 |

How great the "stuage depreciation" should be, is individual for different sawmills, and depends among other things e.g. on sales conditions and how many short lengths occur.

EXAMPLE III

In this example the possibility of more sophisticatedly judging quality IV separately will be demonstrated. The stuage depreciation can for example be put into the programme as a reduction factor of −2 feet with thin boards, −1 foot with 1 inch boards, −½ feet with thicker boards and zero with the remainder. The inspector decides that the piece of lumber shall be a fourth quality piece after 3 cut-off steps, or a fifth quality piece without any cut-off. The price relations are "IV:V=1.20" and "Waste Wood:V=0.15." The length is 18 feet.

Alternative "IV" "Unsorted"
15×1.20+3×0.15=18.145
Alternative "V" ... 18×1.00+0×0.15=18.00

Here arises now the question whether it is worthwhile to produce fourth quality, in view of the rule that the number or quantity of IV quality boards may be included for sale only to 30% of the US grade. Let it be supposed that the computer has registered that 20% of the recent 250 US-quality pieces have been IV quality. A judgment of the possibility of gain is in this case made by the computer in sending signals to the sorting station.

EXAMPLE IV

The inspector considers the possibilities "US after 4 steps cut-off" or "V after 2 steps cut-off" or "waste without cut-off." He presses with the fingers of his one hand the buttons US+V+VI on C and with the fingers on his other hand the buttons for 2 and for 4 steps cut-off on B. The computer means CP "understands" the question, and when the length measurement has been effectuated by D or D' or D", the most favourable alternative—under the present price list programmed into the computer—is determined and corresponding pulses are via CU generated to E and F and the selected choice is shown by means of the one of signal lamps N.

EXAMPLE V

The quality III, IV, V or VI is indicated. Quality IV results in US or V quality, in dependence on the limit gain relatively the risk value according to Example II.

EXAMPLE VI

It is important that illogical indications may be interpreted in a reasonable manner, such as when all three quality indications are given, but only one cut-off alternative, the interpretation given by the computer should be to decide only between the possibility "non-cut sixth" or cut-off fifth quality.

Each price list should contain five magnitudes, viz the three price relations US:V, VI:V and waste wood:V, and further the "stuage depreciation" and the "fourth quality limit." Approximately 20 price lists may be needed in an exporting sawmill to reflect prevailing price conditions. Further at least 10 price lists should be programmed in for controlling the production results in dependence on local conditions. The decision which price list should be used, has to be done before each run by the mill management. The processing unit is preferably a minicomputer with preferably a 4 to 8 thousand words core memory and a console typewriter with reader/punch. The minicomputer needs e.g. at least fifty digital inputs (from three keyboards, the length measuring unit and the "price list selector") and at least 25 digital outputs (to the control unit, and possibly to signal lamps and a table with digital display tubes).

The advantages of the method and apparatus according to the present invention can be evaluated in a sawmill with a yearly production in the value of approximately 20 millions of dollars as follows:

(a) With approximately each tenth board a better selection of the optimal quality is achieved, with an average increase of value by 3%. Gain: $12,000 per year.

(b) The decision concerning the short lengths is made with approximately 5% better economy what concerns the approximately 2% of the total production which lie on the border of the stuage allowance. Gain: $4,000 per year.

(c) The percental share of the higher classified fourth quality can be held nearer to the allowed maximum of 30% of the total US quality, which in its part is assumed to constitute half the production value. An average increase of the percentage from 15% to 19% with say 10% better economy brings a gain of $8,000 in the year.

(d) As the price relations between the quality groups are in a high degree dependent on the market conditions, a fast re-programmation has its peculiar value. If, say once in two years, an appreciation of the changed market conditions is achieved which is half a year earlier than else, the otherwise doubled mistakes according to (a) to (c) above can be avoided, which gives a gain of $6,000 per year.

(e) Losses during the learning of new personnel should totally disappear. If besides five qualified inspectors a new man is needed, which otherwise would cause three times the estimated amount of mistakes according (a) to (c), the gain is $6,000 per year.

The total of these estimates corresponds nearly to 1% of the total production value and perhaps to 10% of the total manpower costs of the sawmill. Besides this economical advantage of the apparatus and method according to the present invention, which makes the new installation soon to be paid-off the reduction of the psychical strain of the inspecting personnel, by elimination of the time pressure, is a further important asset.

The optimalization described aims at the maximal production value of a single piece of lumber, including the risk evaluation with the fourth quality. It is however possible to "cheat" the optimalization by introducing a conveniently modified price list, e.g. to increase the turn-out of the US quality during an emergency delivery situation.

Also production costs can be taken into account, e.g. if there is temporarily a good reason to decrease the number of the different lengths groups at the expense of the production value of the lumber. Such a situation is illustrated in the following:

EXAMPLE VII

A smaller consignment of lumber of a certain dimension shall, after adjustment and quality assortment, also be assorted according to length. To eliminate with the following length packeting a too great share of not full packets, it is decided to temporarily forbid the lengths 7 and 9 feet in the fifth quality and the lengths 7, 9, 11, 13, 15 and 17 feet in the sixth quality. A corresponding order is put into the computer which then instead of a "forbidden length" uses the nearest small lengths for the optimalization and the controlling out-signal. The sequal e.g. for the case "11 feet" in the Example II will be as follows.

Alternative Unsorted ... $(11-4-0-1) \times 1.3 + 0.1 = 8.2$
Alternative V Quality . . . $(11-2-1-1) \times 1.0 + 2 \times 4 \times 0.1 = 7.2$
Alternative VI Quality ... $(11-0-1-0) \times 0.8 + 0 \times 0.1 = 8.0$ In the parenthesis is taken up: the unadjusted length the cut-off—decrease to the nearest allowed length—"-stuage-value-decrease." It is evident from the example that the uncut unsorted quality, which before was the worst alternative, now has become the optimal alternative. In the three other cases in Example II, unchanged final results are obtained.

When in a sawmill as well deals as boards are processed in greater amounts for length adjustment, it is preferable to have at least two prohibition lists programmed. Then it is possible with the help of a push button to introduce the desired prohibition list when there is the risk that an unduly high amount of packets not full would come about. In the prohibition lists, which easily can be changed, any length (with the exception of 6 feet) can be prohibited for unsorted, fifth and sixth qualities.

Packets equalized in length are better paid than packets containing pieces with different lengths, so that a temporary decrease of the number of length possibilities sometimes may result in increased sale value.

The present invention opens also the way for an adjustment works with convertible "end levelling," such as 1 foot and 1 decimeter. The foot alternative would then be used at the production of length packets and the decimeter alternative for shipped packets containing pieces with different lengths, the contents and value of which would thus be increased by approximately 2%.

The expressions "sorting station," "controller," "cutting works," "sorting works," and "packet" are sometimes referred to in the art as "control station," "brackers," "trimming plant," "sorting plant," and "package," respectively.

The computer used in carrying out this invention is of conventional type such as mark PDP 11 of the Digital Equipment Corporation or Nova 2 of the Data General Corporation.

I claim:

1. A method of cutting untrimmed pieces of lumber and sorting the cut pieces of lumber according to quality, comprising:
   measuring the length of each untrimmed piece of lumber;
   selecting a plurality of alternative cut-off lengths for each piece of lumber;
   determining the quality value of each usable piece of lumber which would result from cutting in each of said alternative cut-off lengths;
   calculating the total value of the usable piece of lumber and a cut-off waste piece resulting from cutting in each of said alternative cut-off lengths by multiplying the length of said usable and waste pieces by their respective quality value and summing each pair of said multiplications;
   determining the cut-off length which produces the maximum total value of said usable and waste pieces from said untrimmed piece of lumber; and
   cutting said untrimmed piece of lumber at the cut-off length which was determined to yield the maximum total value.

2. The method of claim 1 further including the step of sorting each of said usable pieces according to the quality thereof.

3. The method of claim 1 further including the step of disregarding the selection of usable pieces having a predetermined length and instead selecting the cutoff length producing usable pieces having a different length and the next maximum total value.

4. The method of claim 1 further including the step of disregarding the selection of a cut-off length producing usable pieces having a predetermined length and quality and instead selecting a cut-off length producing usable pieces having a different length and a different quality and the next maximum total value.

5. A system for allowing an operator to cut untrimmed pieces of lumber and sort the resulting usable pieces according to quality, comprising:
   length measuring means for measuring the length of each untrimmed piece of lumber and for generating a length output indicative thereof;
   a cutting station having saw means for cutting said pieces of lumber into at least one usable piece and one cut-off waste piece in accordance with a cut-off length command signal;
   a first selection device allowing said operator to select a plurality of cut-off outputs indicative of a plurality of alternative cut-off lengths for said untrimmed piece of lumber;
   a second selection device allowing said operator to select a plurality of quality outputs indicative of the quality of each usable piece resulting from each of said alternative cut-off lengths; and
   programmable calculating means receiving said cut-off outputs, said quality outputs and said length output for calculating the total value of usable and waste pieces resulting from each of said alternative cut-off lengths, and for selecting as said cut-off length command signal the alternative cutoff length producing the maximum total value of the usable and waste pieces according to said program.

6. The system of claim 5 wherein said calculating means determines the value of the usable and waste pieces for each alternative cut-off length according to the formula:

$$X_n = (L - S_n)Q_n + S_n W$$

where L is the length of said untrimmed piece of lumber as measured by said length measuring means, $S_n$ is the nth alternative cut-off length, $Q_n$ is the quality value of the usable piece resulting from the $S_n$ cut-off length, W is the relative value of said waste piece and $X_n$ is the total value of the usable and waste pieces resulting from the $S_n$ cut-off length.

7. The system of claim 6 wherein said calculating means includes a digital computer, and the values for $Q_n$ and W are entered into said computer by a console typewriter.

8. The system of claim 5 wherein said selection stations further include display means for indicating the cut-off length selected by said calculating means to yield the maximum total value.

9. The system of claim 5 further including control means for precluding said calculating means from selecting a predetermined cut-off length and for causing said calculating means to instead select as said command signal the alternative cut-off length producing the next highest total value.

10. The system of claim 5 further including control means for precluding said calculating means from selecting a cut-off length yielding usable pieces of a predetermined length having a predetermined quality, and for causing said calculating means to instead select as said command signal an alternative cut-off length producing usable pieces having a different length and quality and the next higher total value.

11. The system of claim 5 further including a plurality of storage bins, each corresponding to a predetermined quality value of usable pieces, and conveyor means controlled by said calculating means for delivering usable pieces from said cutting station to the storage bin corresponding to the quality value selected by said calculating means.

* * * * *